United States Patent
Horie et al.

(10) Patent No.: US 6,487,597 B1
(45) Date of Patent: Nov. 26, 2002

(54) PERSONAL DIGITAL ASSISTANT AND INFORMATION TRANSMISSION APPARATUS FOR USE WITH THE PERSONAL DIGITAL ASSISTANT

(75) Inventors: Takuya Horie, Fussa (JP); Masaaki Yanagisawa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/366,077

(22) Filed: Aug. 3, 1999

(30) Foreign Application Priority Data

Aug. 6, 1998 (JP) .......................................... 10-234944

(51) Int. Cl.[7] .............................................. G06F 13/00
(52) U.S. Cl. ...................................................... 709/227
(58) Field of Search ................................ 709/200, 201, 709/203, 217, 218, 219, 227, 228, 229, 230, 231, 232

(56) References Cited

U.S. PATENT DOCUMENTS

| | | | | |
|---|---|---|---|---|
| 5,727,159 A | * | 3/1998 | Kikinis ........................ 709/246 |
| 5,818,425 A | * | 10/1998 | Want et al. .................. 345/158 |
| 5,831,664 A | * | 11/1998 | Wharton et al. .............. 348/13 |
| 5,983,073 A | * | 11/1999 | Ditzik ........................ 455/11.1 |
| 6,088,730 A | * | 7/2000 | Kato et al. .................. 709/227 |
| 6,185,208 B1 | * | 2/2001 | Liao ............................ 370/392 |
| 6,249,276 B1 | * | 6/2001 | Ohno .......................... 345/173 |
| 6,285,889 B1 | * | 9/2001 | Nykanen et al. ............. 455/557 |
| 6,292,833 B1 | * | 9/2001 | Liao et al. ................... 709/229 |
| 6,334,126 B1 | * | 12/2001 | Nagatomo et al. ............. 707/4 |
| 6,336,142 B1 | * | 1/2002 | Kato et al. .................. 709/227 |
| 6,339,780 B1 | * | 1/2002 | Shell et al. .................. 707/526 |

FOREIGN PATENT DOCUMENTS

| JP | 7-21404 | 1/1995 |
|---|---|---|
| JP | 9-319646 | 12/1997 |

* cited by examiner

Primary Examiner—Moustafa M. Meky
(74) Attorney, Agent, or Firm—Frishauf, Holtz, Goodman & Chick, P.C.

(57) ABSTRACT

An information transmission apparatus is provided which has a connection unit for connection with a personal digital assistant in a wired, wireless or optical manner for transmitting information. When a portion of data displayed by an active one of programs is specified and a transmission command is given, the transmission apparatus transmits the specified portion of the data as a new file to the personal digital assistant, which receives the transmitted file, stores the same in a data area depending on the kind of the file, and displays the file in a display form depending on the kind of the file.

10 Claims, 22 Drawing Sheets

FIG.14A

| MEMO PAD | NEW | RETRIEVE | FILE | |
|---|---|---|---|---|
| A LIST OF MEMOS | | | | REGISTERED DATE |
| △△△△ | | | | 1998/8/18 |
| ×××× | | | | 1998/9/10 |

| MEMO PAD | NEW | RETRIEVE | FILE | |
|---|---|---|---|---|
| A LIST OF MEMOS | | | | REGISTERED DATE |
| △△△△ | | | | 1998/8/18 |
| ×××× | | | | 1998/9/10 |
| ◆ ELECTRONIC NOTEBOOK : NEW FUNCTION | | | | 1998/9/15 |

32

| MEMO PAD | NEW | RETRIEVE | FILE | |
|---|---|---|---|---|
| A LIST OF MEMOS | | | | REGISTERED DATE |

◆ ELECTRONIC NOTEBOOK : NEW FUNCTION ↵
Personal computer viewer : Text data or table data can be ↵
copied to clipboard on a personal computer, transferred ↵
simply to electronic notebook and utilized. ↵

33
Mediterranean travel, ↲
There are many delicious dishes in the Mediterranean sea.- - - -
- - - - I traveled from Rome by air to Spain. In Spain, we enjoyed bullfight - - - - - - - - - - - - - - - - - - - - - - - - - - - - - - - - - - - - -
- - - - I bought at reasonable prices at street stalls many bottles of wine popular among local people and then returned. ↲

34
Mediterranean travel,    -1 ↲
There are many delicious dishes in the Mediterranean sea.- -
- - - - I traveled from Rome by air to Spain. ↲

35
Mediterranean travel,    -2 ↲
Rome by air to Spain. In Spain, we enjoyed bullfight - - - - - -
- - - - I bought at reasonable prices ↲

36
Mediterranean travel,    -3 ↲
I bought at reasonable prices at street stalls many bottles of wine popular among local people and then returned. ↲

| SPREADSHEET | NEW | RETRIEVE | FILE | | | | | | | |
|---|---|---|---|---|---|---|---|---|---|---|
| A LIST OF SPREADSHEETS | | | | | | | | | | REGISTERED DATE |
| ○○○○ | | | | | | | | | | 1998/8/18 |

| SPREADSHEET | NEW | RETRIEVE | FILE | | | | | | | |
|---|---|---|---|---|---|---|---|---|---|---|
| A LIST OF SPREADSHEETS | | | | | | | | | | REGISTERED DATE |
| ○○○○ | | | | | | | | | | 1998/8/18 |
| Maker | | | | | | | | | | 1998/9/10 |

41

PERSONAL DIGITAL ASSISTANT AND INFORMATION TRANSMISSION APPARATUS FOR USE WITH THE PERSONAL DIGITAL ASSISTANT

BACKGROUND OF THE INVENTION

The present invention relates to a personal digital assistant and an information transmission apparatus for use with the personal digital assistant and more particularly to a personal digital assistant and an information transmission apparatus for use with the personal digital assistant capable of displaying data, for example, in texts or spreadsheets.

Since the personal digital assistant (which can be hereinafter simply referred to as "PDA") is so small that it can be accommodated in a pocket and can operate for a considerably long period of time with a battery source, it has excellent convenience not found in a desktop personal computer, for example, in that even a user who is out can use it whereas it has a drawback that its small size limits the size of a keyboard and that the data inputting efficiency is low inevitably. In this respect, some of PDAs have a transparent touch panel attached to a display screen such that one of icons appearing on the screen is touched with a pen tip or the like to facilitate an inputting operation. However, it is apparent that the pen-touch input efficiency is greatly low compared to that of a general blind touch operation at the keyboard.

In addition, since the PDAs usually have a small display size, a small data storage capacity and a low processing speed compared to desktop personal computers, they are not suitable for processing a large amount of data at high speeds such as data collection through the internet.

Now, the roles of the desktop personal computers and the PDAs have been settling such that the desktop personal computers take charge of collecting a large amount of data from the outside via the internet or the like and inputting data from a general keyboard while the PDAs take charge of fetching and utilizing required data from the collected or inputted large amount of data as requested.

FIG. 22 illustrates a desktop personal computer (hereinafter simply referred to as "personal computer") connected to a PDA, in which connectors 3 and 4 provided to both of the PDA and the personal computer 2 are connected by a dedicated communication cable 5.

The connectors 3 and 4 and the cable 5 have structures and electrical specifications conforming to predetermined interface standards. RS (recommended standard)-232C established by EIA (Electronic Industry Association in United States) is typical of such standards.

For instance, when browser data collected by the personal computer 2 from the outside through the internet browser or a word processor file created by the personal computer 2 is transferred to the PDA 1, a user first connects the cable 5 between the personal computer 2 and the PDA 1, as shown in FIG. 22, and then turns on a power source for the PDA 1 to prepare for information reception. The user starts up a communication program in the personal computer 2 to transmit the browser data or the word processor file to the PDA 1.

Further, it is sometimes desired to transmit only a portion of a file collected by or inputted in the personal computer to the PDA. Especially, recently, such a demand has increased since a large amount of information is available easily via personal computer communication or the internet. To this end, as in the above case, a user performs an applied operation which includes connecting the cable as shown in FIG. 22, turning on the power source for the PDA 1 to prepare for information reception, starting up a browser program or a word processing program in the personal computer to open a desired data file, selecting the range of a part of a character string to be transmitted on a screen of the personal computer 2, copying it to a predetermined work area (clipboard) in a memory, then starting up an editor program for text data, pasting the data on the clipboard, saving the data under any particular file name, starting up a communication program and then transmitting the text file to the PDA 1.

However, the applied operation requires an extremely complicated operation which includes copying a desired range of the displayed data, preparing for and starting up another editor program to save the range as a separate file. It is very difficult especially for a beginner who does not have enough knowledge about the clipboard and the editor program to understand and utilize the applied operation.

SUMMARY OF THE INVENTION

It is therefore an object of the present invention to make it possible to transmit only a desired portion of data in an information transmission apparatus (personal computer or the like) in a simple operation to a personal digital assistant, or to store the thus transmitted data into the personal digital assistant in a simple operation such that a required portion of the data obtained by the information transmission apparatus (personal computer or the like) can be utilized easily in the personal digital assistant.

In order to achieve the above object, according to the present invention, there is provided an information transmission apparatus which contains various kinds of programs each having a function of displaying data, comprising:

connecting means for connecting the information transmission apparatus with a personal digital assistant in a wired, wireless or optical manner for transmission of information, specifying means for specifying the range of any part of data displayed based on an active one of the programs and to be sent to the personal digital assistant, transmission commanding means for commanding transmission of the specified range of any part of data to the personal digital assistant; and transmission control means, responsive to the transmission commanding means commanding transmission of the specified range of any part of data, for creating a new file including the specified range of any part of data and for transmitting the file via the connecting means to the personal digital assistant.

In order to achieve the above object, according to the present invention, there is also provided an information transmission apparatus comprising:

event generating means, responsive to a use's predetermined manipulation, for generating a predetermined event, storing means, responsive to the generation of the predetermined event, for storing data on a clipboard, producing means for producing a new file from the data on the clipboard stored by the storing means; and transmitting means for transmitting the produced file to a personal digital assistant via a communication port in a wired, wireless or optical manner.

According to the present invention, when a desired range of a part of a large amount of data is specified which is obtained and displayed by one of various kinds of programs on the information transmission apparatus (personal computer or the like), the data is transmitted as a new file to the personal digital assistant. The personal digital assistant can receive the transmitted file, store it in a predetermined data area, and display and use its contents.

BRIEF DESCRIPTION OF THE DRAWINGS

FIGS. 14A and 14B illustrate display screens which display lists of memorandum notes before and after data transfer, respectively;

FIG. 15 illustrates a display screen which displays a memo-note text;

FIG. 16 schematically illustrates divisional files;

FIGS. 20A and 20B illustrate display screens which display the lists of spreadsheets before and after data transfer, respectively;

DETAILED DESCRIPTION OF THE PREFERRED EMBODIMENT

Preferred embodiments of the present invention will be explained for a PDA having a communication function as an example with reference to the accompanying drawings.

Figure 1:
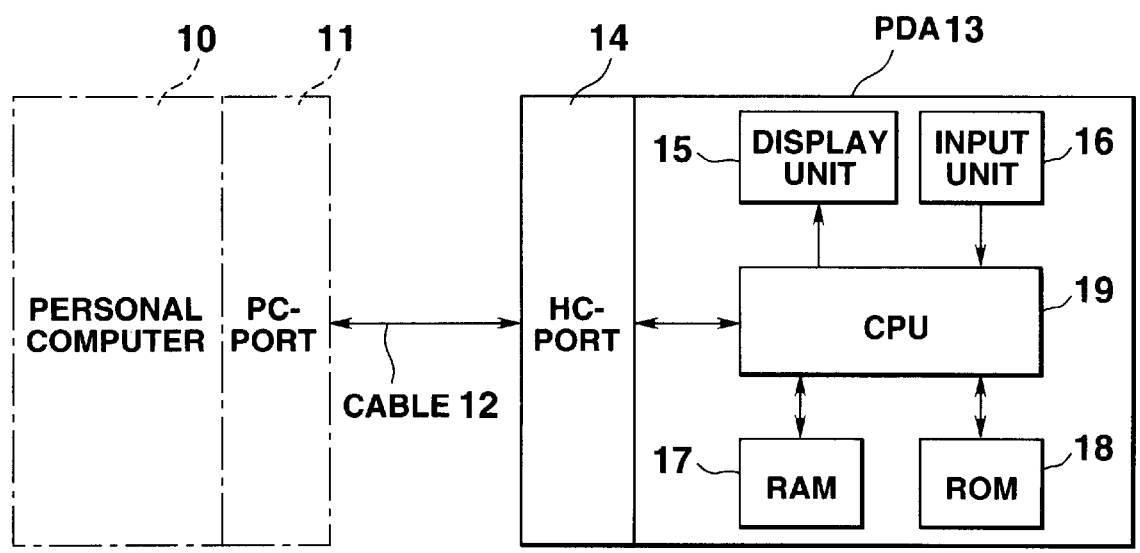
FIG. 1 is a block diagram of a personal computer and a PDA connected in one embodiment of the present invention.

Shown in FIG. 1 are a personal computer (information transmission apparatus) 10, a communication port 11 of the personal computer 10 (hereinafter referred to as "PC port"), a communication cable 12, a PDA 13, a communication port 14 of the PDA 13 (hereinafter referred to as "HC port"), a display unit 15 (display means), an input unit 16, a RAM 17, a ROM 18, and a CPU (detecting means, determining means, storage means and display control means) 19.

<Composition and Function of Personal Computer 10>

The personal computer 10 can execute various application programs under a general OS having at least a function of a clipboard and an inter-application communication function (DDE: Dynamic Data Exchange). Although not shown, it includes an input/output unit such as a display, a mouse and a keyboard, a main board having operation/storage/control sections such as a CPU and a memory, external memories such as a hard disk or a floppy disk, a casing and various extension boards mounted through slots provided in the casing in the extension ports of the main board.

Generally, two RS-232C ports (COM 1 and COM 2) are mounted on the main board of the personal computer 10. Further, COM 3, COM 4, - - - can be disposed additionally by adding commercially available communication boards, but it is assumed here that COM 1 is allocated to the PC port 11 in this embodiment for the sake of convenience. Further, the personal computer 10 is connected with other personal computers on other networks via a network circuit.

Application programs executed properly by the personal computer 10 include, for example, an internet browser program, a word processing program for creating sentences and a spreadsheet program for creating an account leaf for example, of a financial table. Such programs have been used most frequently both officially and privately and they are typical of tools for creation, edition and processing of various information. Of course, the tools for creation, edition and processing of information are not restricted to them.

In addition to the application programs described above, a clipboard program (CLIPBRD.EXE appended to Windows 95) and a data transfer program used exclusively for controlling data transfer between the PDA 13 and the personal computer are also used in this embodiment. The data transfer program has a function of getting data on the "clipboard" via the DDE communication channel and transferring the data to the PDA 13 in accordance with predetermined protocols.

Figure 2:
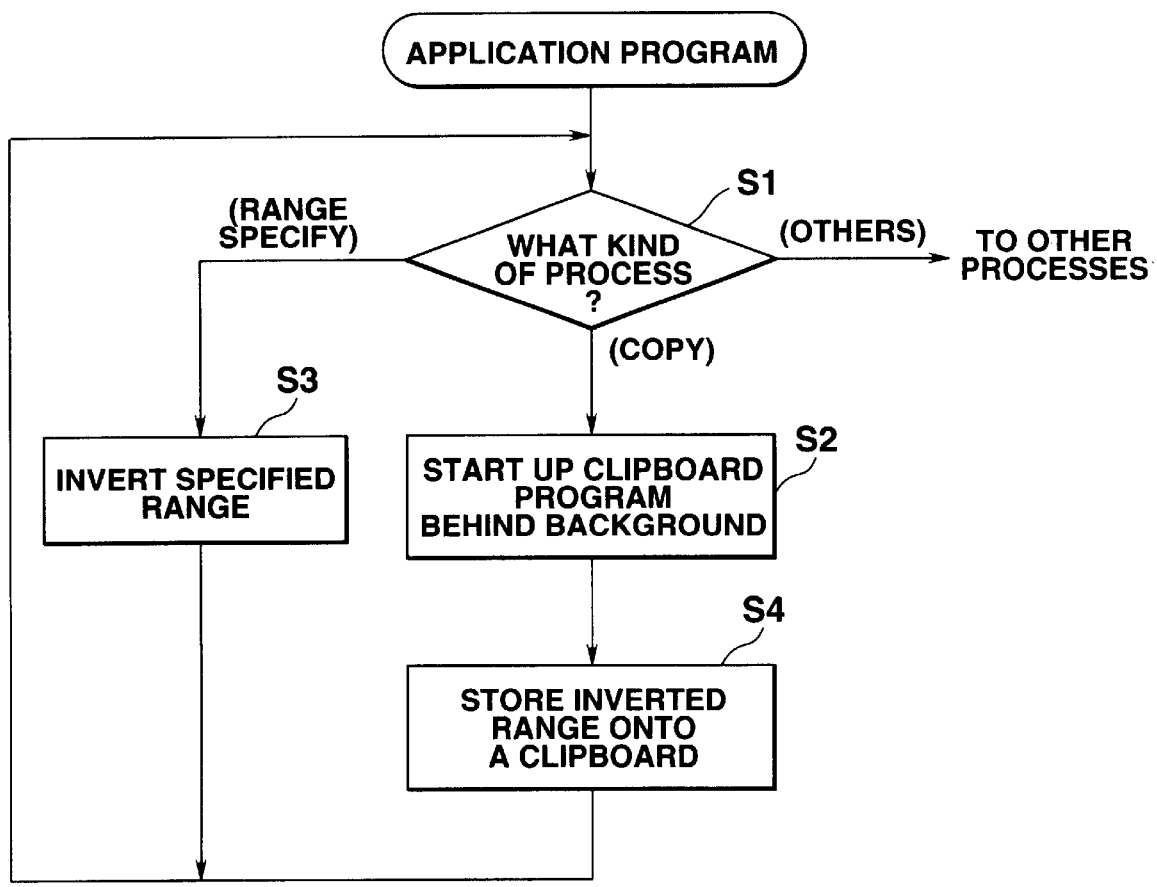
FIG. 2 is a flow chart of range designation and a copying operation.
Figure 3:
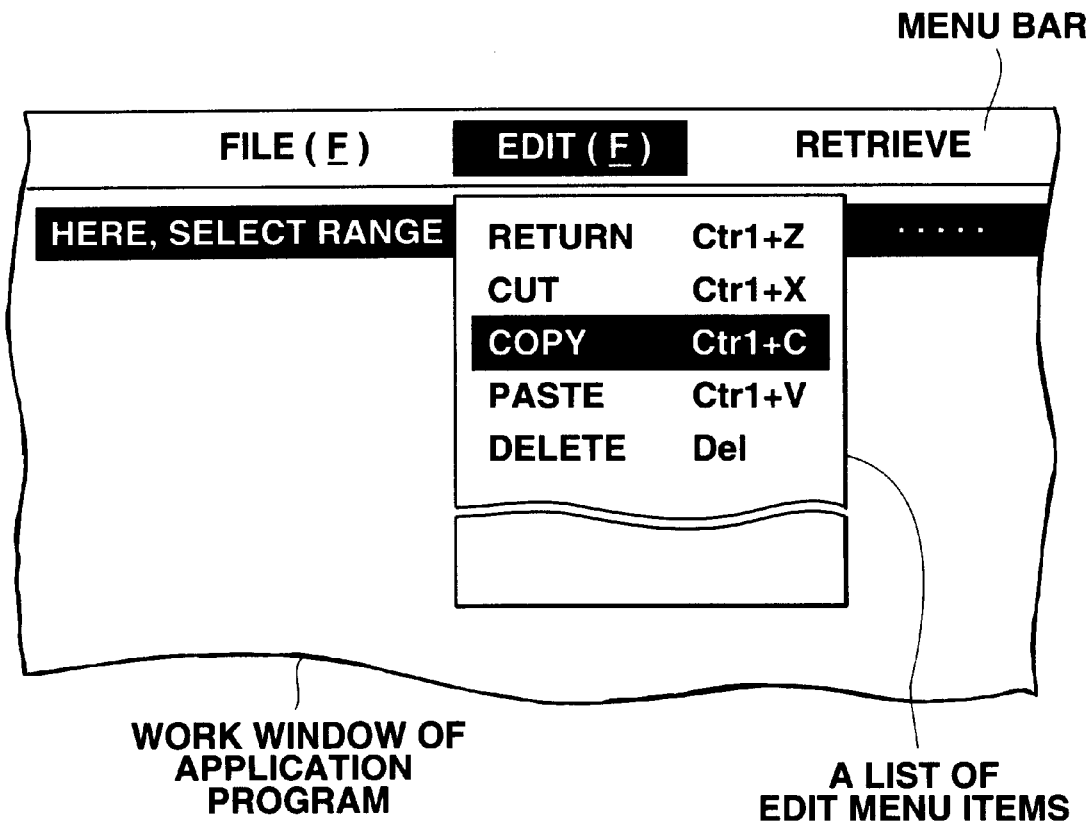
FIG. 3 shows a selected "copy" menu.

As shown in FIG. 2, when "copy" is executed in an optional application program (usually contained in an "edition" menu item, FIG. 3) (S1), the clipboard program 22 starts up behind background (S2) to extract only text data from a selected range of the application program (displayed in an inverted manner on a work window: S3) and then to store it (S4). It can be said to play the role of data transfer data between two application programs ("copy" and "paste" or "cut" and "paste").

Figure 4:
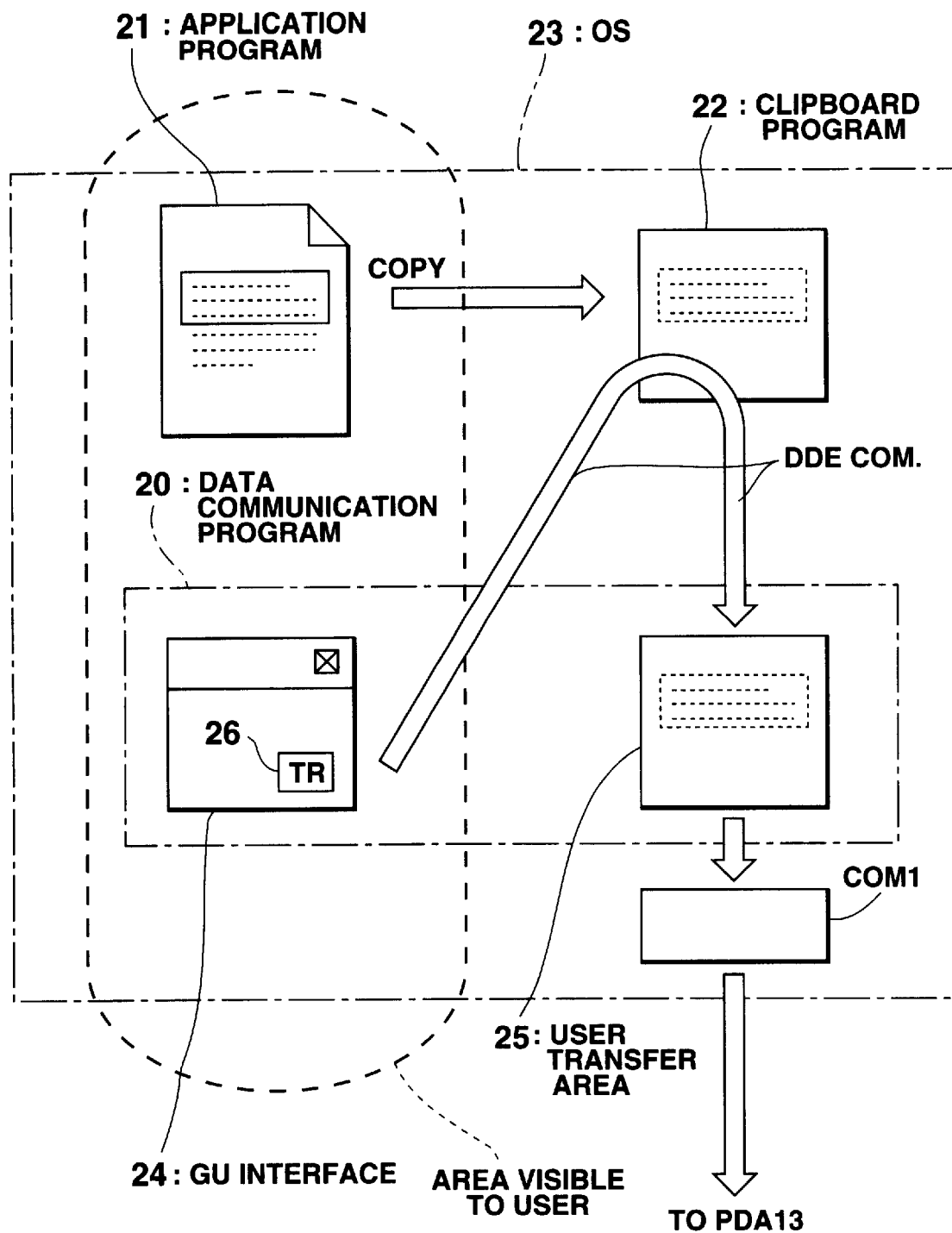
FIG. 4 conceptually illustrates a copying operation and DDE communication in the embodiment.

FIG. 4 schematically illustrates the function of a data communication program (transmission means) 20 which has at least the function of a DDE client application, operates together with an optional application program 21 (for example, the word processing program in this embodiment) and a clipboard program 22 under the control of a common OS 23 to provide a GU (graphical user) interface 24 to a user and transfers the data in a transfer data area 25 (storing means) through the COM 1 to the PDA 13.

The GU interface 24 is provided with a "transmit" command button 26 (event generating means), and an event procedure for successively executing the following processes is described in the click event of the command button 26. In this embodiment, a program "Visual Basic"

(registered trade mark) of a simple structure will be described as an example for convenience sake, but the present invention is not restricted to this particular case.

(1) Start of DDE Communication

DDE communication is initiated by using the clipboard program 22 as a DDE server application program. That is, a DDE Initiate function is executed using a DDE server application name of the clipboard program 22 (generally, an extension-free execution type file name: "CLIPBOARD" in the case of the clipboard program 22). If the specified DDE server application program has been started up, the DDE Initiate function returns a usable DDE communication channels number.

Since an "error in execution" is generated if the DDE server application program has not been started up upon execution of the DDE Initiate function, the error is trapped and the DDE Initiate function is executed again after starting the clipboard program 22 is started up by using a Shell function.

(2) Data Acquisition from DDE Server Application

A DDE Request function is executed by specifying the DDE communication channels number returned upon execution of the DDE initiate function and a predetermined "topic" promoting acquisition of text data copied onto the clipboard program 22 (a unit of data to be processed by the DDE server application program). Since the DDE Request function returns the data specified by "topic" (text data in the case of the clipboard program 22) if the specified channel number is active and the specified "topic" is correct (or supported by the DDE server application), the returned data value is temporarily stored in the transfer data area 25 of FIG. 4.

(3) Termination of DDE Communication

A DDE Terminate function is executed by specifying a DDE communication channels number returned upon execution of the DDE Initiate function. The process for terminating the DDE communication has to be explicitly. The communication channel would be kept open to thereby consume the system resources uselessly (hereinafter referred to as memory leak) if the procedures are closed without performing a process for termination.

(4) Communication with PDA 13

The personal computer opens the COM 1, has negotiations with the PDA 13 in accordance with the communication protocol, and then transmits as a new file data stored in the transfer data area 25 in FIG. 4 to the PDA 13. In this embodiment, RS232C is used as the transmission protocol, but the present invention is not restricted to this particular case. A network protocol such as TCP/IP, NetBELTI or IPX/SPX, or interface standards for peripheral equipment for the computer such as IEEE 1284 or 1394 or USB may be used instead. Also, the communication medium is not restricted to ones using the cable, but it may be a wireless system using radio waves, rays of light or acoustic waves.

An OLE (Object linking and Embedding) function, may be used instead of the DDE. In that case, control shifts to the side of the server application program (the processing need be executed by the server application program). Thus, the use of the DDE is preferred in view of the efficiency of developing programs in the case of OLE.

<Composition and Function of PDA 13>

As described above, the PDA 13 comprises the HC port 14, the display unit 15; the input unit 16, the RAM 17, the ROM 18, the CPU 19 and a notebook-sized casing (not shown) and has four main functions, namely, "operation", "storage", "input/output" and "control" like the personal computer 10. The PDA performs required steps of selectively loading on the RAM 17 any desired one of programs contained in the ROM 18, using man-machine interface via the input unit 16 which includes a touch panel or a keyboard, executing it in CPU 19 and displaying the result on the display unit 15.

Figure 5:
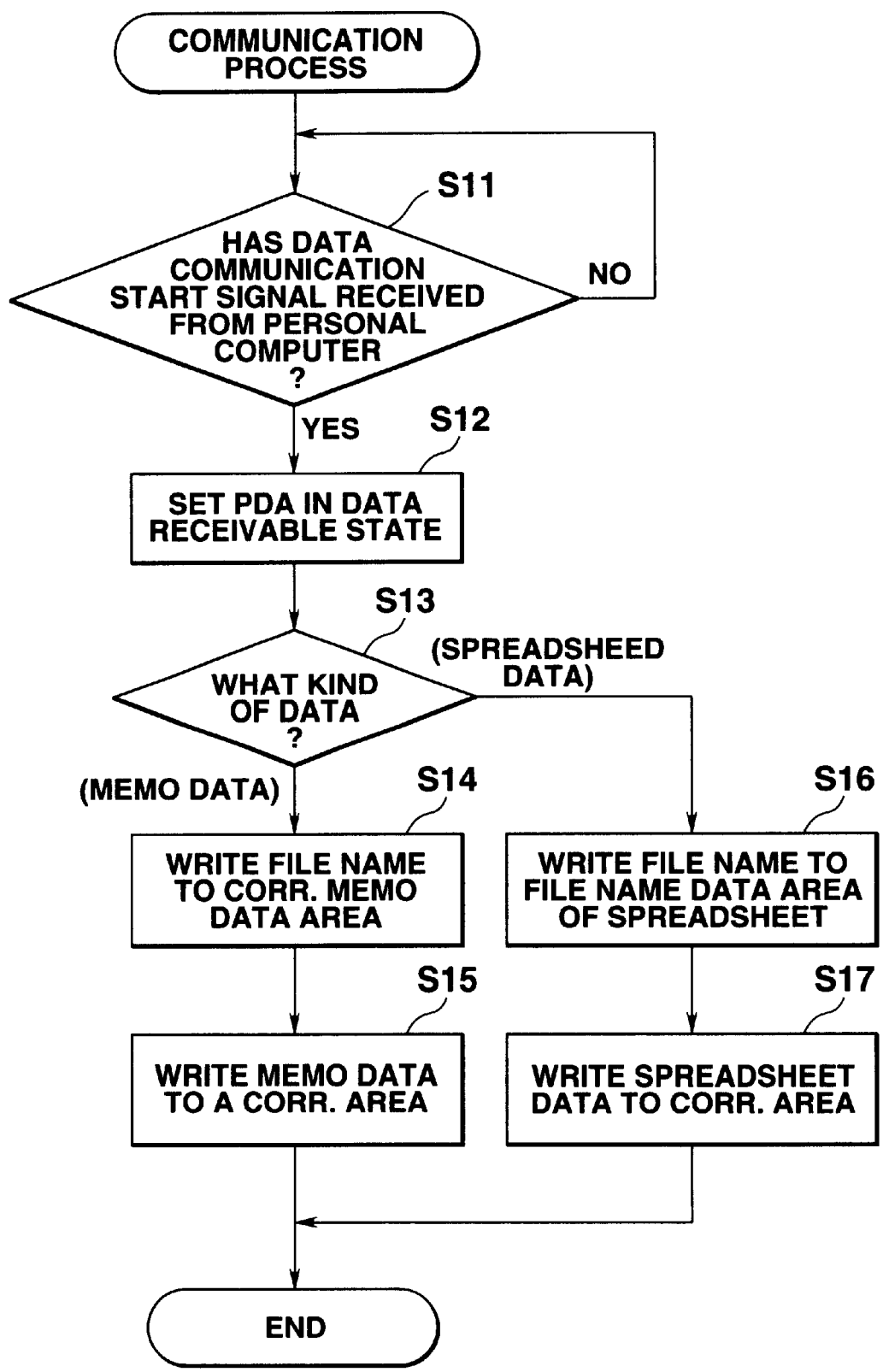
FIG. 5 is a flow chart of a process performed by a communication program.

One of the required steps described above is a communication process for receiving a file of text data or spreadsheet data transferred via the HC port 14. FIG. 5 is a flow chart performed by its program. The program is executed, for example, by selecting a communication start menu item displayed on the display unit 15 in a state where the PC port 11 of the personal computer 10 is connected to the HC port 14 by the cable 12.

When the execution starts, the PDA waits for an appropriate transmission start signal outputted from the PC port 11 of the personal computer 10 (S11). Upon detection of the transmission start signal the PDA becomes ready to receive data (S12). Then, it gets a data file transferred from the personal computer 20 after the transmission start signal and determines the kind of the data file, for example, whether this is text data (memorandum data, in the illustrated embodiment) or a spreadsheet data (S13), for example depending on the presence or absence of a "delimiter".

The reason for this is as follows: For instance, Excel or Lotus 1-2-3 (registered trade mark) typical of a spreadsheet program for use with personal computers will be taken as an example. When the range of some of a plurality of cells of the spreadsheet opened on a work window of the spreadsheet program is specified and copied onto the clipboard, data on a ruled line between the cells is replaced with a predetermined delimiter, for example, a comma (,) or tab code on the clipboards, and the data on the clipboard is transferred as a new file from the personal computer 10 in this embodiment.

Accordingly, when a delimiter is found in a character string of the data (between the head of the data and a new-line start code, between a new-line start code and the next-line start code or between a new-line start code and the end of the line), the data of the transferred file is determined as spreadsheet data.

General text data can sometimes contain such a delimiter accidentally. In this case, the number of delimiters contained in a first line is required to be compared to that contained in a second line. This is because the number of delimiters is the same in all the rows in the spreadsheet data whereas the number of delimiters contained in the text data may vary from line to line with high probability. Further, in order to aim at perfection, the number of lines to be compared may be increased to three or more.

When the determination of the kind of the data ends, the transferred data is stored in a data area corresponding to the kind of the data to complete the processing (S15, S17). In this case, a process for creating a file name is performed (S14, S16). In this process, the whole, or any number of head characters, of a character string contained in the first line of the transferred data proper (ranging from the head of the data to the first new-line start code) are used as a file name, which is then written into a file name data area for a "memorandum" when the data is text data (memorandum data) (S14), while it is written into a file name data area for "spreadsheet" when it is spreadsheet data (S16).

In summary, in the present embodiment, the following operations are performed:

(A) The personal computer 10 and the PDA 13 are connected, as shown in FIG. 1;

(B) Any particular application program 21, for example a word processing program, is started up on the personal computer 10 to open an existent word processor file (or create a new file);

(C) A range of a part of a character spring displayed on the work window of the application program 21 is specified;

(D) An "edition" menu of a menu bar and then "copy" in its list are selected, or a predetermined short cut key operation is performed (simultaneously "CTRL" and "C" keys are depressed) without selecting the "edition" menu to send only the text data of the character sting part of the selected range (data representing character codes free from format information) can be sent to the clipboard program 22;

(E) A predetermined communication processing program (shown in FIG. 5) is then started up by the PDA 13 and the data communication soft 20 by the personal computer 10; and (F) A "execution" common button 26 in the GU interface 24 of the data communication program is depressed to transfer the character string copied onto the clipboard program 22 as a new file via the user transfer area 25 of the data communication program 20 and the COM 1 to the PDA 13.

Accordingly, if a user only knows at least (1) how to specify the range of a part of a character string, (2) a method of utilizing an "edition" menu of the menu bar and a "copy" in its list, and (3) the presence of a "transmit" command button 26 provided to the GU interface 24 of the data communication program 20, the user can easily convert a file form to a new one (for example, from a word processor data containing format information into text data containing no such information) and transmit the new file to the PDA 13, or the PAD 13 can store the transmitted file data therein in a simple operation, even when the user does not completely recognize the presence of the clipboard and the way of using the clipboard, thereby promoting the sharing of information between the personal computer 10 and the PDA 13.

The data is not restricted to the text data and the spreadsheet data. It may be binary data of images or voices. This is because they can be transferred as text data by converting them in MIME or BinHex or Uuencode (of course, although the text data takes the form of meaningless arranged codes) and it can be reproduced as an original binary file in inverse conversion using a similar method at the receiving end.

In the embodiment described above, the two operations which includes (D)) selecting "copy" in the "edition" menu of the menu bar and (G) depressing the "execution" command button 26 in the GU interface 24 of the data communication program 20 have been performed. If the function of "copy & transfer execution" is added to the "edition" menu of the menu bar, the specified range of a part of a character string can be transmitted to the PDA in a single operation. This can be attained by adding the function into the appropriate application program.

<Second Embodiment>

For the sizes of both of the text data and the spreadsheet data, the number of cells of a spreadsheet page is set, for example, at 256 row x 256 columns at a maximum, whereas there is basically no upper limit to the size of the text data. On the other hand, the PDA 13 handles the text data with a "simple" edition tool such as a socalled memo-note. A file size of such a simple edition tool is often restricted to generally about 2 KB. As the case may be, a portion of the transferred text data (exceeding 2 KB) can not be received by the PDA 13, undesirably.

In the second embodiment, when a file of text-data in excess of a certain size is to be transferred; it is divided into sub-files of the same size, which are then transferred to the PDA 13 to thereby solve the abovementioned problem.

Figure 6A:
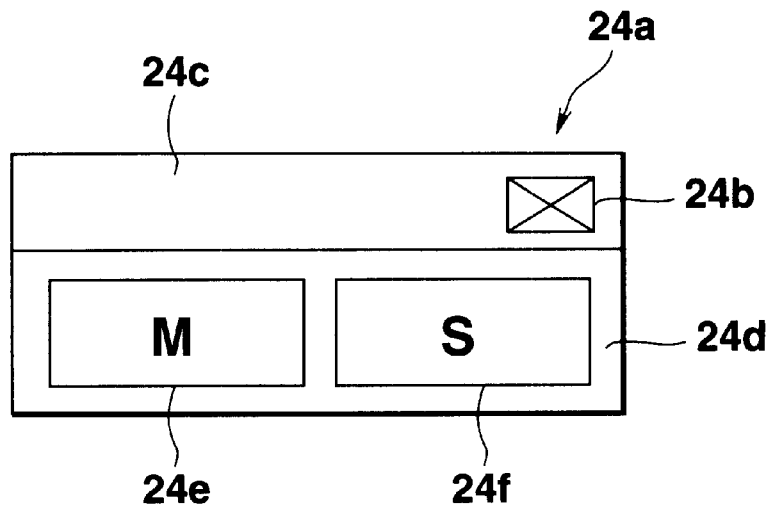
FIG. 6A illustrates a GU interface layout of a data communication program.
Figure 6B:
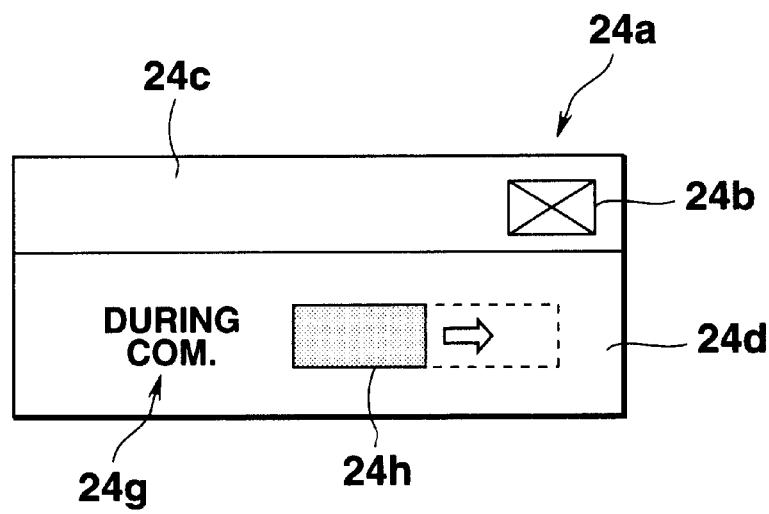
FIG. 6B illustrates a preferred example of the GU interface to be used during communication.

FIG. 6A shows a GU interface 24a contained in the data communication program 20 in the second embodiment. As shown in FIG. 6A, the GU interface 24a is designed in a style familiar with a so-called multi-window OS, having a title bar 24c with a "close" button 24b disposed at the right-hand end and a window object 24d adjacent the lower side of the title bar 24c. In this embodiment, the window object 24d has two "M" and "S" command buttons 24d and 24f in which "M" and "S" represent the first letters of "memorandum" and "spreadsheet data", respectively, for the sake of illustration. Actually, they should be an appropriate character string or mark in terms of the uses interface. FIG. 6B shows a preferred example of the GU interface 24a to be used du ring communication in which the two command buttons 24e, 24f of the window object 24d are hidden (Visible property: False) and in which a text control 24g having a character string "during communication" and a scale bar control 24h graphically expressing the degree of progress of communication are provided instead.

Figure 7:
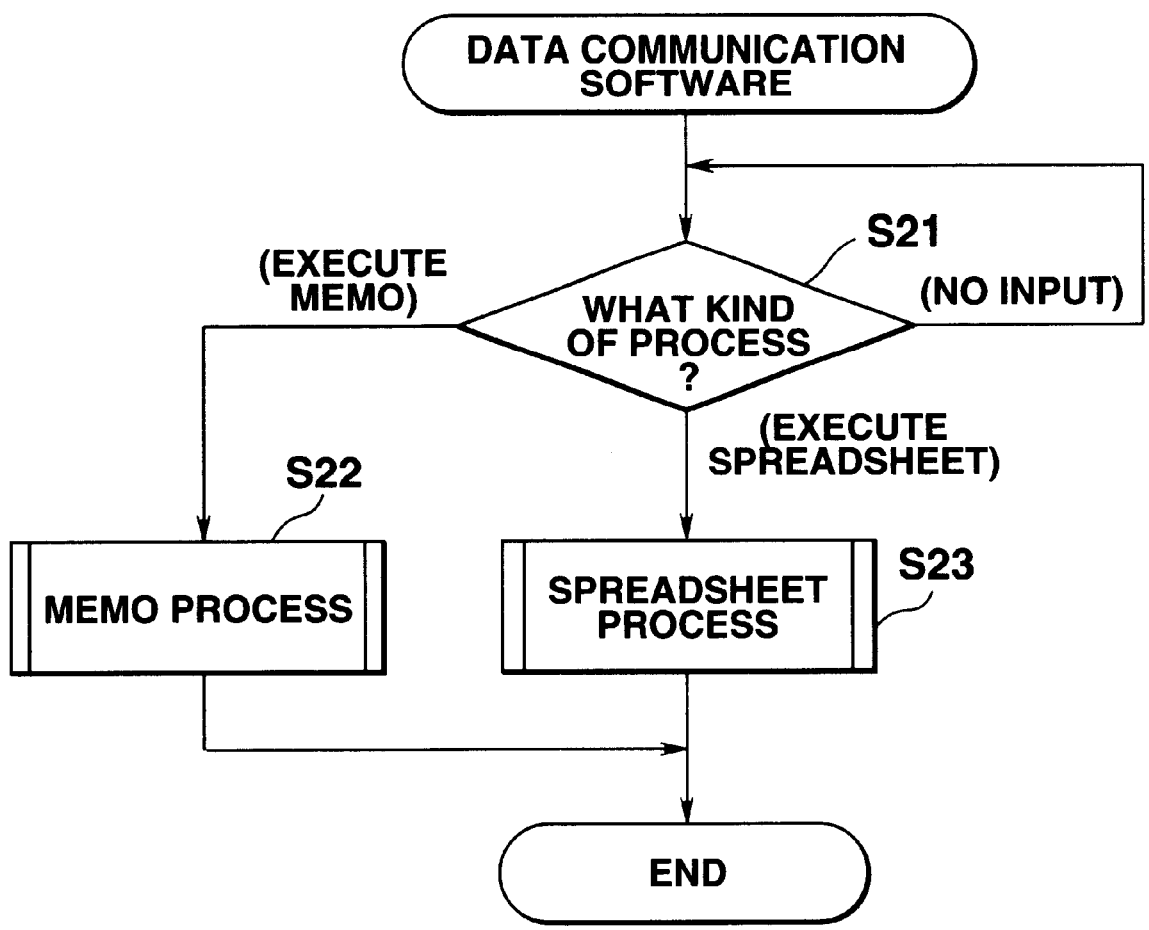
FIG. 7 is a flow chart of a process performed by the data communication program.

FIG. 7 is a flow chart of a button event determining program which determines which of the two command buttons 24e and 24f has been depressed and which starts up an appropriate processing program depending on the result of the determination. The program is under execution during display of the GU interface 24a shown in FIG. 6A on the screen, and waits for depression of one of the two command buttons 25g and 24f (S21). A "memorandum processing" program is started up (FIG. 8) when the "M" command button 24e is depressed (S22), while a "spreadsheet processing program is started up when the "S" command button 24f is depressed (FIG. 10) (S23).

Figure 8:
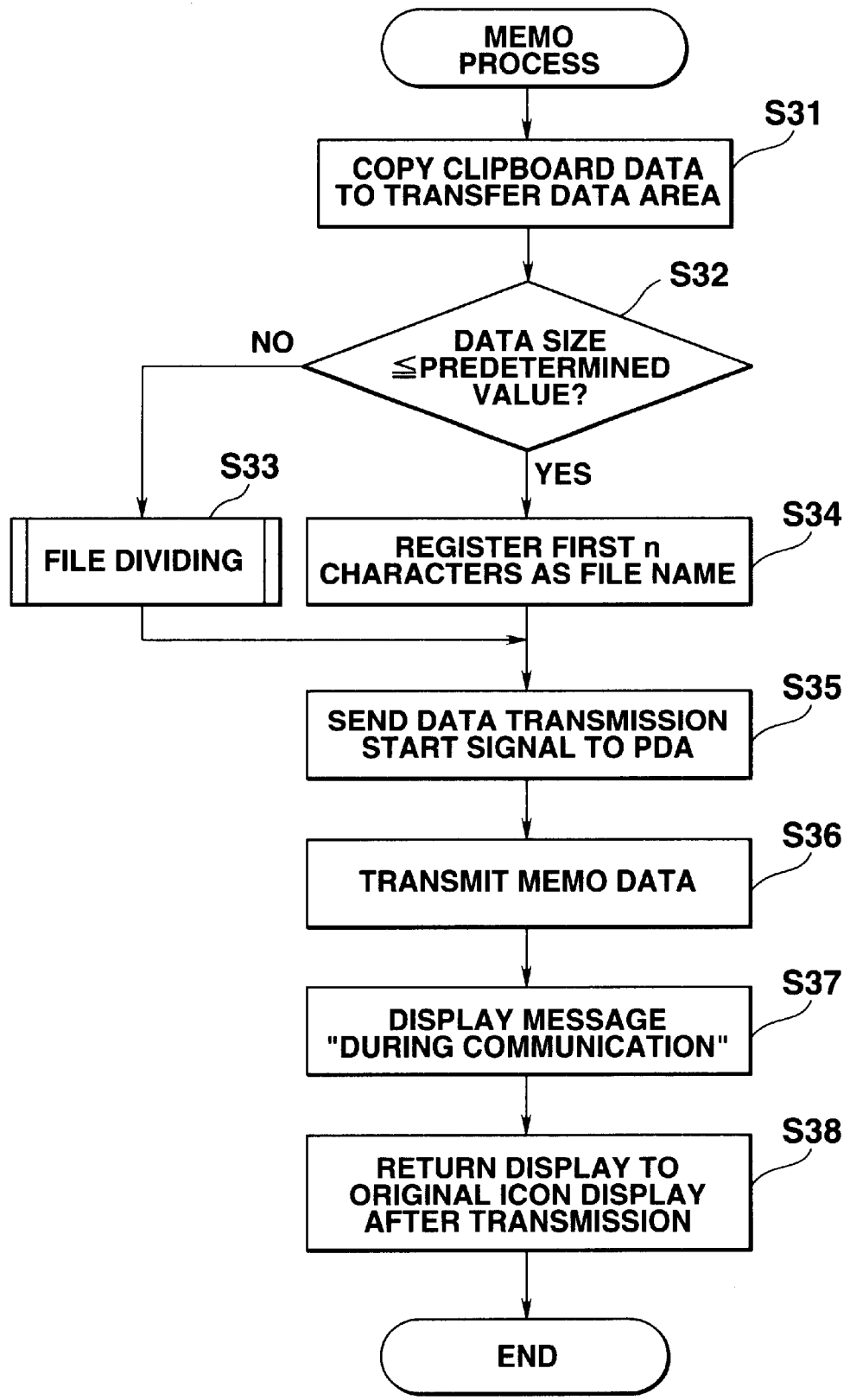
FIG. 8 is a flow chart of a process performed by a memorandum processing program.

FIG. 8 is a flow chart of the memorandum processing program which successively stores (text) data copied onto the clipboard into the transfer data area (S31), compares its data size with a predetermined value (for example, 2 KB) (S32), registers the first n characters (for example, n=20) as a file name if the size is less than the predetermined value (S34), sends a data transmission start signal to the PDA 13 (S35), transmits a memorandum data (S36), changes the indication of the GU interface 24a to "during communication" (FIG. 6B)(S37), and returns the display of the GU interface 24a to the original state (FIG. 6A) upon completion of the transmission (S38). If the data size is of not less than the predetermined value, the program does not perform the registering step for the file name (S34) but instead executes a "file dividing process."

Figure 9:
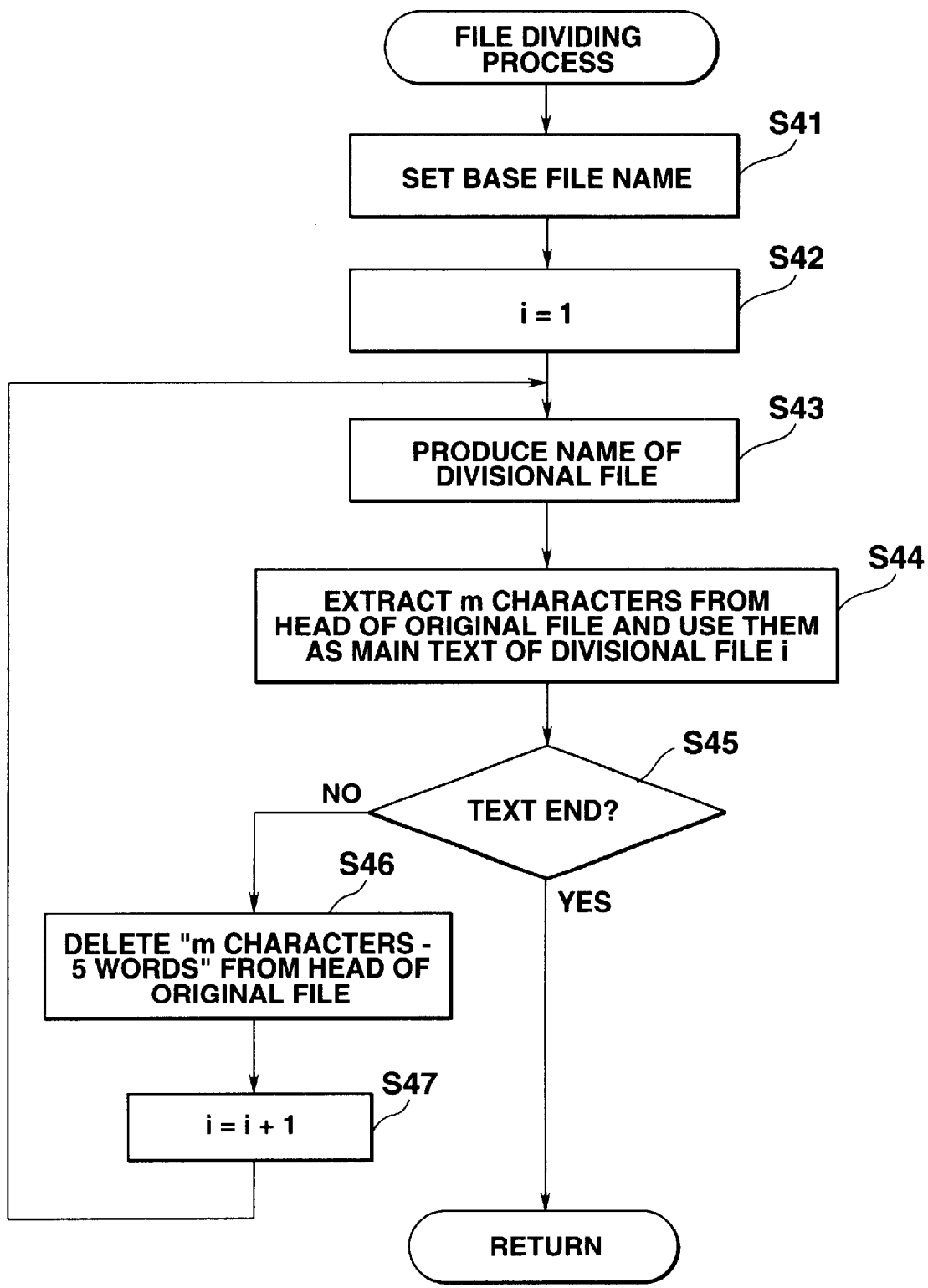
FIG. 9 is a flow chart of a process performed by a file division processing program.

FIG. 9 is a flow chart of the file dividing process program which registers the first n characters (for example, n=20) of the text data stored in the transfer data area (hereinafter simply referred to as "original file") as a base file name (S41) for convenience sake, sets an initial value "1" repeatedly in a variable "i" (S42) and then adds j spaces and a hyphen (-) and "i" to the end of the base file name to produce a file name of a divisional file i (S43). The thus produced divisional-file name is "ABCDEFGHIJKLMNOPQRST □□□-1" assuming the base file name is "ABCDEFGHIJKLMNOPQRST", "j" is 3 and "i" is 1. The square □ represents one space.

Then, the first m characters are extracted from the head of the original file (where m represents an appropriate number of characters not exceeding the maximum number of characters present in the memo-note of the PDA 13) as a main text of the divisional file i (S44). If it does not reach the end of the text of the original file (S45), "m characters—5 words" are deleted from the head of the original file to update the original file (S46), "i" is incremented by one (S47) and then the steps performed after production of the name for the divisional file i (S43-) are repeated.

The numerical value "5 words" in "m characters-5 words" in step S46 points to the number of overlapping words in the divisional files. Thus, if the last words in the divisional file i is "... aaa bbb ccc ddd eee fff ggg hhh iii jjj" for instance, the last 5 words "fff ggg hhh iii jjjj" are left at the head of the next divisional file i+1. Provision of the overlapping characters serves to avoid a difficulty occurring in the division of the file, namely, "continuity of sentences is difficult to understand".

Figure 10:
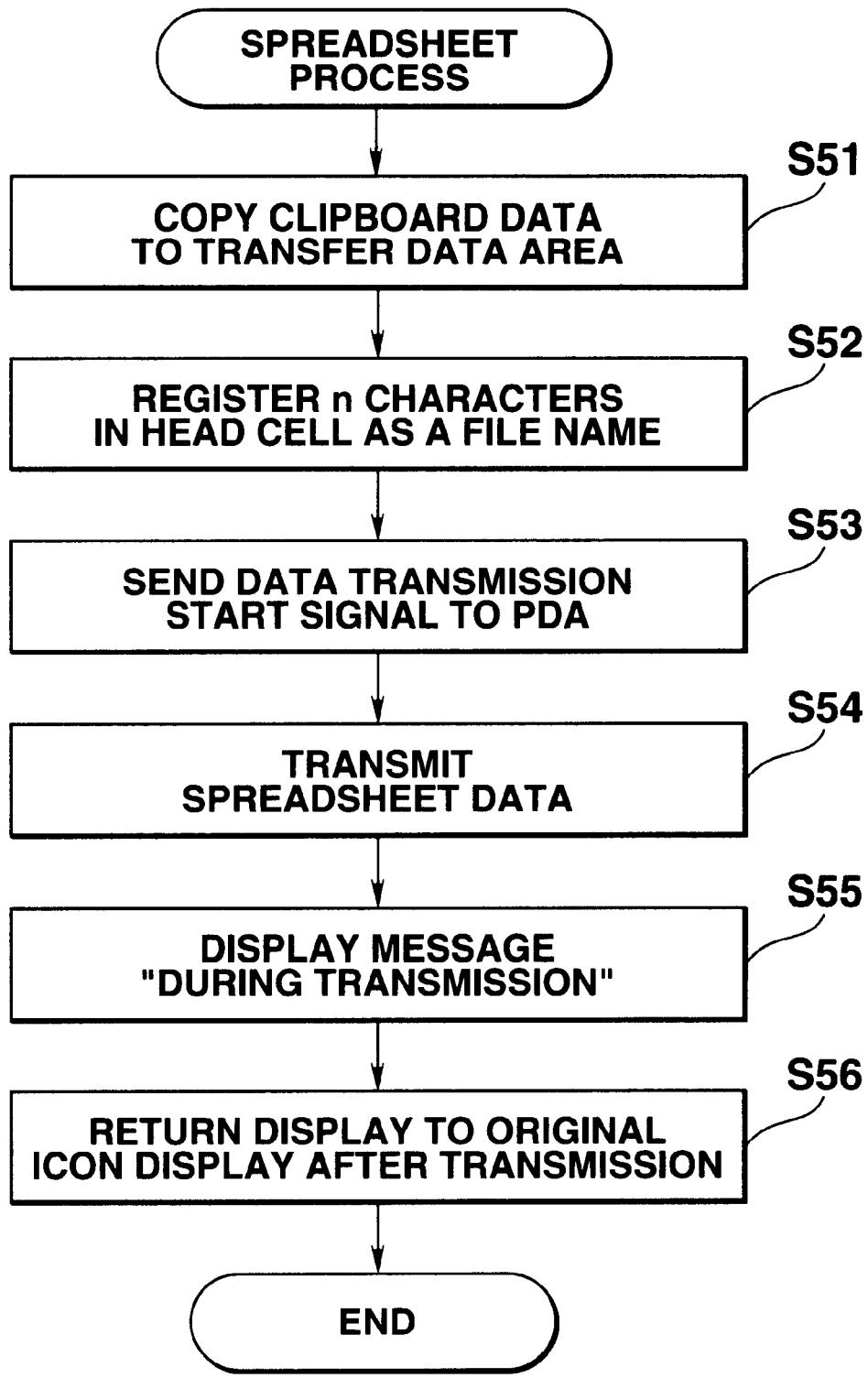
FIG. 10 is a flow chart of a process performed by a spreadsheet processing program.

FIG. 10 is a flow chart of the spreadsheet processing program which is substantially identical with the flow chart shown in FIG. 8, except that the former flowchart handles a different kind of data, and lacks the step for determining the file size (S32) and the step for executing the file dividing program (S33). That is, the program of the flowchart of FIG. 10 sequentially executes the steps for storing in the transfer data area the data copied to the clipboard (spreadsheet data) (S51), registering the first n characters of the data (for example, n=20) as a file name (S52), sending a data transmission initiate signal to the PDA 13 (S53), transmitting the spreadsheet data (S54), changing the display of the GU interface 24a to "during communication" (FIG. 6B)(S55) and, upon completion of transmission, returning the display of the GU interface 24 to the original state (FIG. 6A) (S56).

In the second embodiment as described above, information on the kind of the memorandum data or spreadsheet data is also transmitted from the personal computer to the PDA Data information may be transmitted separately from the file name, an extension (txt) representing the memorandum data, or an extension (csv) representing the spreadsheet data may be attached to the file name, as shown by "ΔΔΔ.txt" or "ooo.csv" and then sent along with the file name.

In this case, the PAD determines the kind of the data in accordance with the data kind information transmitted from the personal computer at step S13 in FIG. 5 and writes the transmitted data to a corresponding data area.

<Third embodiment>

Figure 11:
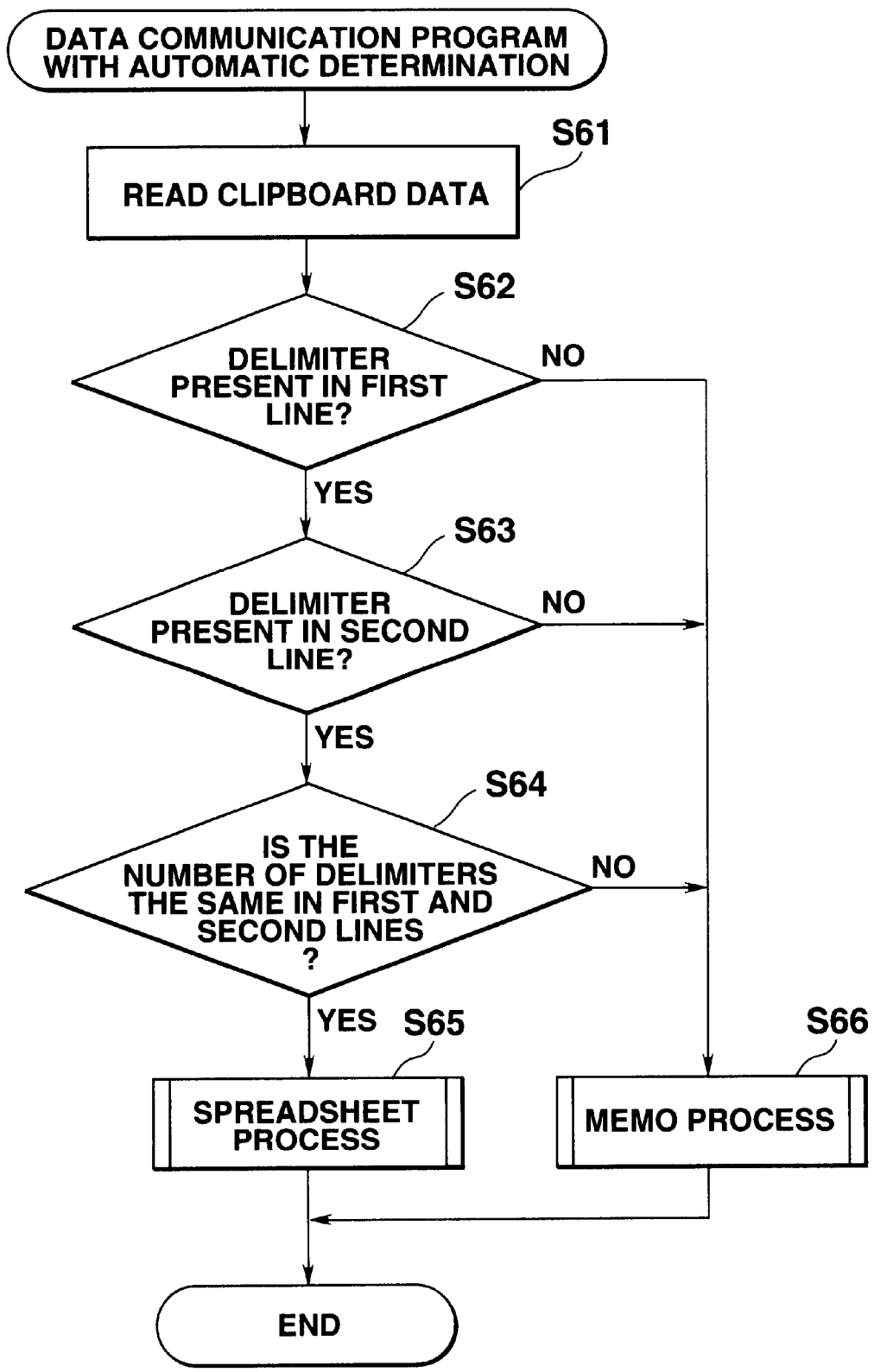
FIG. 11 is a flow chart of a process performed by a data communication program having an automatic determining function.

In the second embodiment described above, the text data and the spreadsheet data are transmitted by "manually" selecting and clicking the respective two command buttons 24e and 24f provided to the GU interface 24a. Since a wrong one of the buttons can be depressed, there is still room for improvement. FIG. 11 shows an example of a data communication program with a function to automatically determine the kind of data, which includes an improvement to the program shown in FIG. 7.

The improved program serves to perform the steps for storing the data copied on the clipboard into the transfer data area (S61), determining that the data is spreadsheet data if predetermined delimiters (such as commas or tab codes) are present in both of a first line (ranging from the head of the data to the first new-line start code) and a second line (ranging from the first-new line start code to a second new-line start code) (S62, S63) and if those delimiters in the first and second lines are equal in number (S64), and starting up the spreadsheet processing program shown in FIG. 10 (S65), or determining that the data is text data, and starting the memorandum processing program (FIG. 8) (S66) if otherwise.

For example, if EXCEL or LOTUS 1-2-3 is taken as an example, the concept of the automatic data determination is based on the fact that when the range of some of a plurality of cells of the spreadsheet opened on the work window of the spreadsheet program is specified and copied onto the clipboard, information on a ruled line between any cells is changed to a predetermined delimiter, for example, a comma (,) or a tab code on the clipboard, as described previously.

As the automatic data determination method, if the application of the copy source is a spreadsheet, the transferred data is required to be spreadsheet data while if it is a word processing program, the transferred data is required to be memorandum data.

The data information determined automatically as described above may be transmitted separately from its file name; or may be transmitted by attaching to the file name an extension (txt) indicating the memorandum data or an extension (csv) indicating the spreadsheet data, for example, as "ΔΔΔ.txt" or "ooo.csv".

<Actual Screen Display Example>

1. Transfer of Text Data

Figure 12:
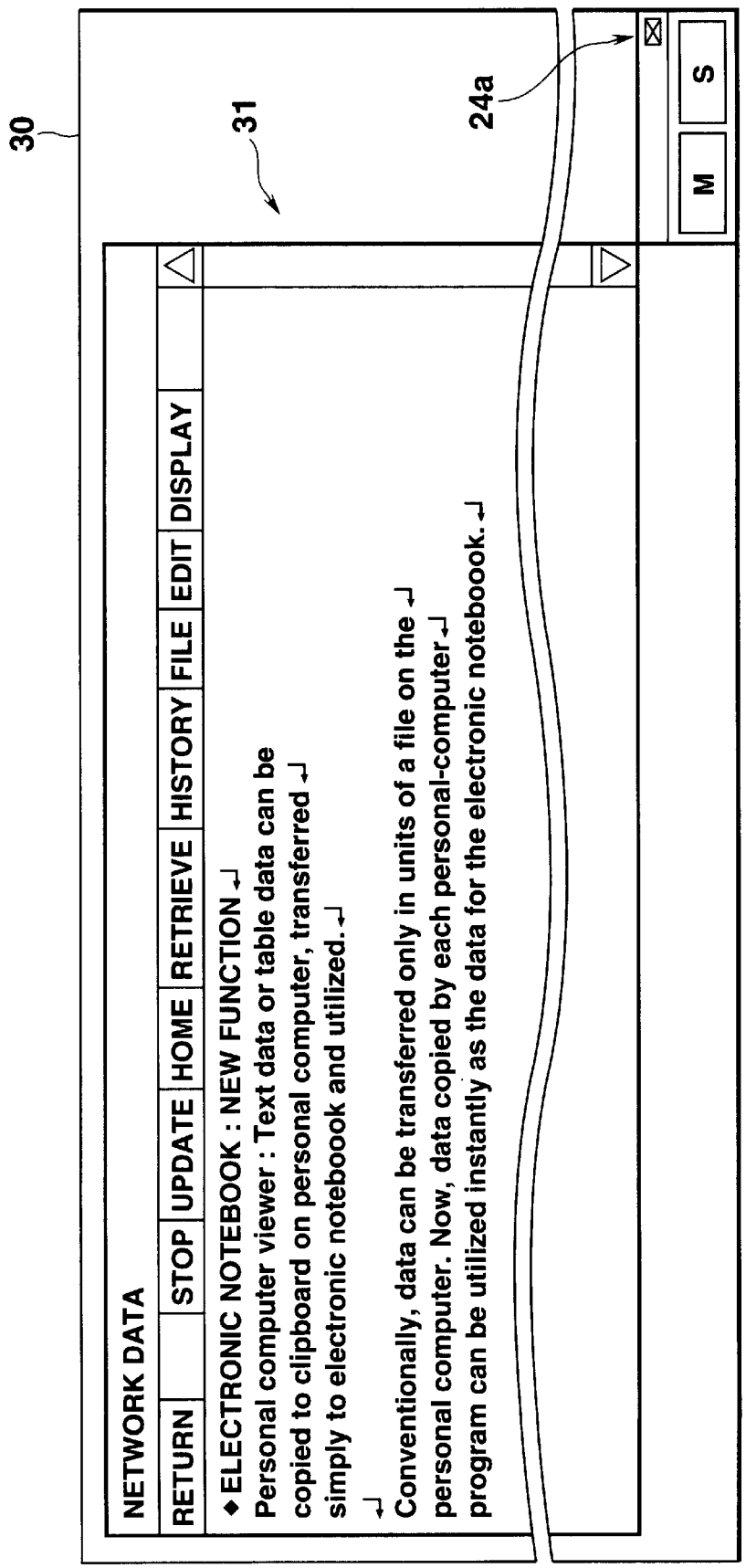
FIG. 12 illustrates a display screen on which a word processing program and a data communication program are open.

FIG. 12 illustrates a display screen 30 of the personal computer 10. On the display screen 30, an application program 31 (the internet browser program in this case) and the GU interface 24a of the data communication program 20 are opened. In the browser program, a new-line start code and the like are generally not displayed, but they are visually shown in the Figures for the sake of explanation.

Figure 13:
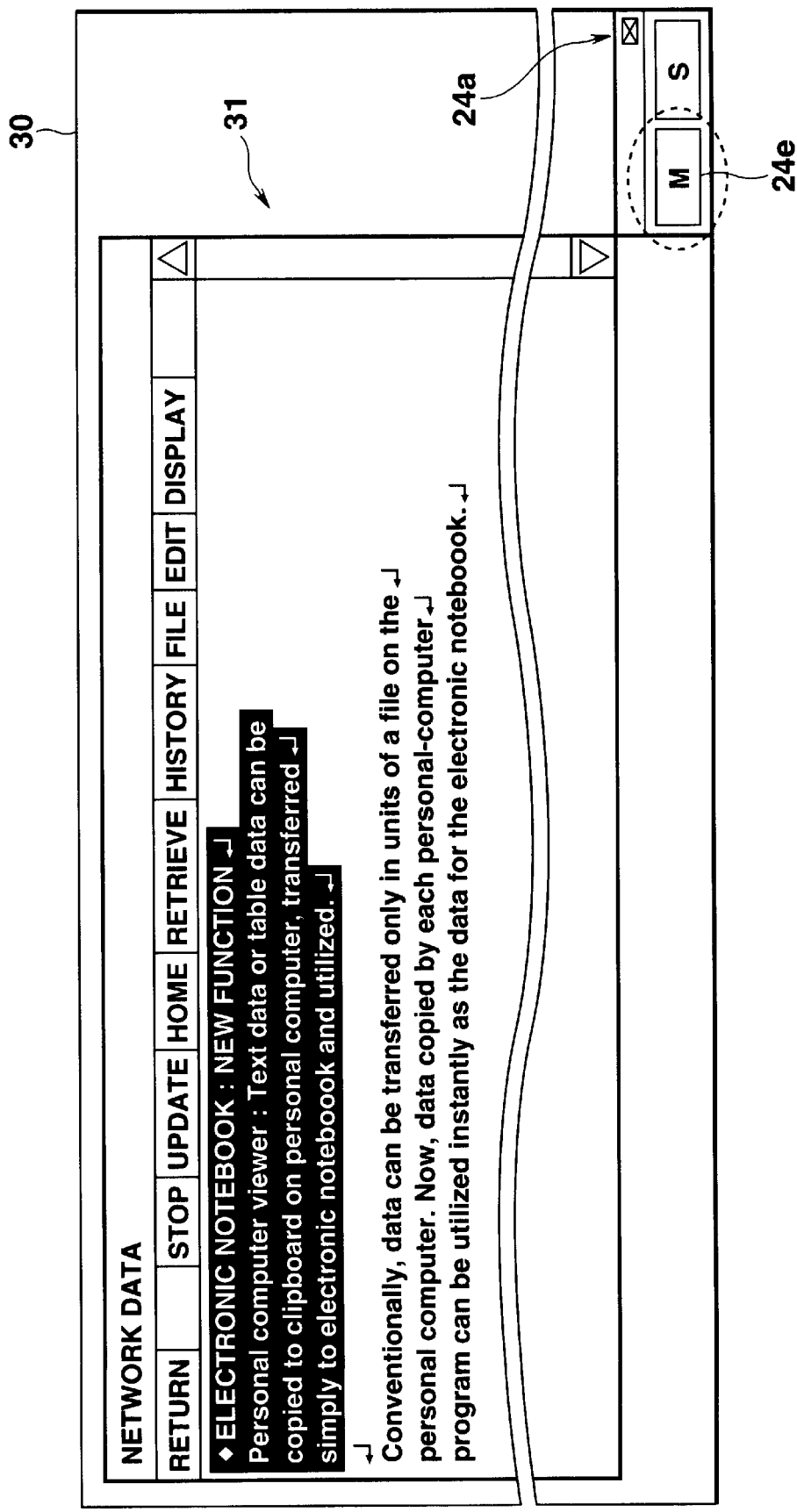
FIG. 13 illustrates a display screen on which the range of a text specified by a word processing program is displayed in an inverted manner.

As shown in FIG. 13, when the application program 31 is set as an active window (with a focus) and when the range of any particular portion of a displayed character string is specified with a mouse (the desired range is dragged while the mouse is being kept clicked), the character string portion within the range is displayed in an inverted manner as shown. When the "M" command button 24e on the GU interface 24a is clicked in this state, the data communication program (FIGS. 7 or 11) is executed and the specified range of the character string portion is transmitted to the PDA 13. It is, of course, necessary that the PDA 13 has been connected by the cable 12 with the personal computer 10, and that the communication processing program (FIG. 5) has been executed in the PDA 13.

FIG. 14A shows an example of a list of memorandums in the memo-note before "data transfer" displayed on the PDA 13, and FIG. 14B an example of the list "after data transfer", in which a character string in the first line in the selected range in FIG. 13 ("♦ New function of an electronic notebook") is additionally displayed as a title. Then, when the title is clicked, the main text of the memorandum in FIG. 15 is opened and the full text in the selected range of FIG. 13 is displayed.

2. Transfer of a Large-Size Text Data

FIG. 16 shows a text data 33 of a large size (for example, in excess of 2 KB) and its divisional files 34–36. The dividing files 34–36 are produced by the file division program shown in FIG. 9.

More particularly, since ten characters (underlined by a solid line) at the end of the first divisional file 34 and ten characters at the head of the second divisional file 35 (underlined by a broken line) overlap, and ten characters at the end of the second divisional file 35 (underlined by a solid line) and ten characters at the head of the third divisional file 36 (underlined by a broken line) overlap, disadvantage of the file division (the continuity of sentences is difficult to recognize) is avoided.

Figure 17:
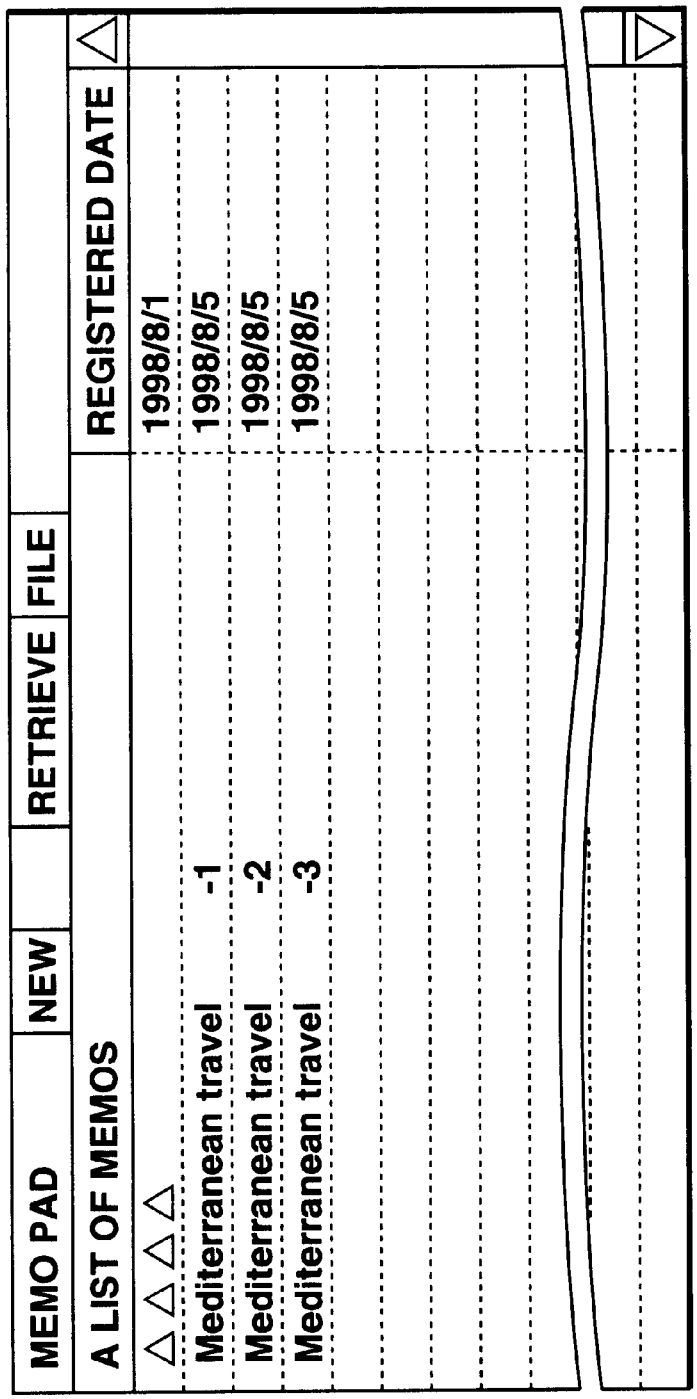
FIG. 17 illustrates a display screen which displays a list of divisional files.

The first line of each of the divisional files 34–36 represents a file name of that file. As described above, the divisional file name includes a first line of the text data 33 as a base file name ("Mediterranean travel" in this example) and j spaces, a hyphen (-) and a divisional file number "i" added to the end of the base file name. Thus, it can be seen from the common portions of the divisional file names (the base file name) that those divided files belong to the same text file 33 and, further, the order of arrangement of the sentences can be recognized from their serial numbers -1, -2, ... (FIG. 17).

3. Transfer of Spreadsheet Data

Figure 18:
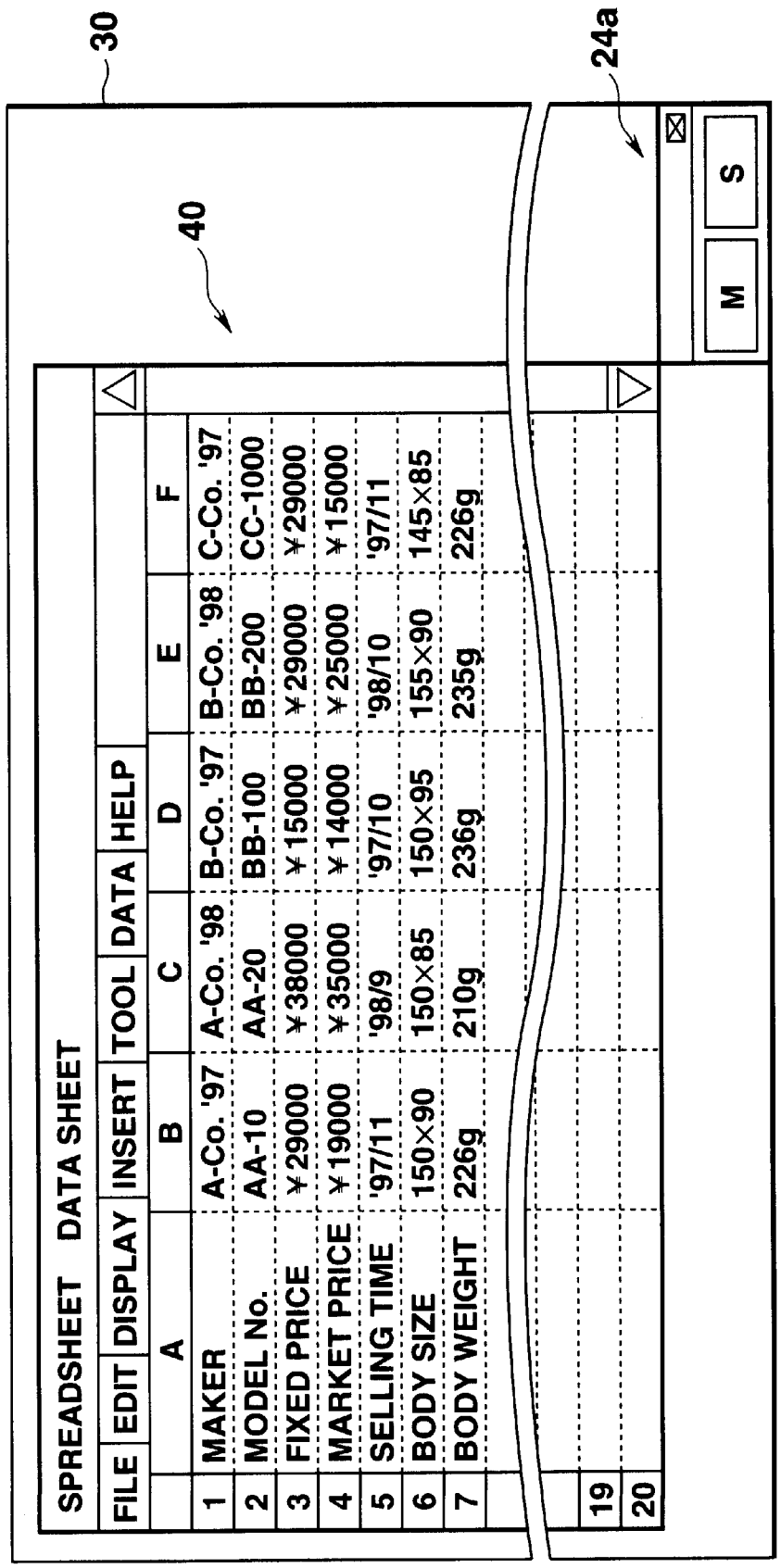
FIG. 18 illustrates a display screen on which a spread sheet program and a data communication program are open.

FIG. 18 shows a display screen 30 of the personal computer 10. On the display screen 30, an application program 31 (spreadsheet program in this example) and the GU interface 24a of the data communication program 20 are open.

Figure 19:
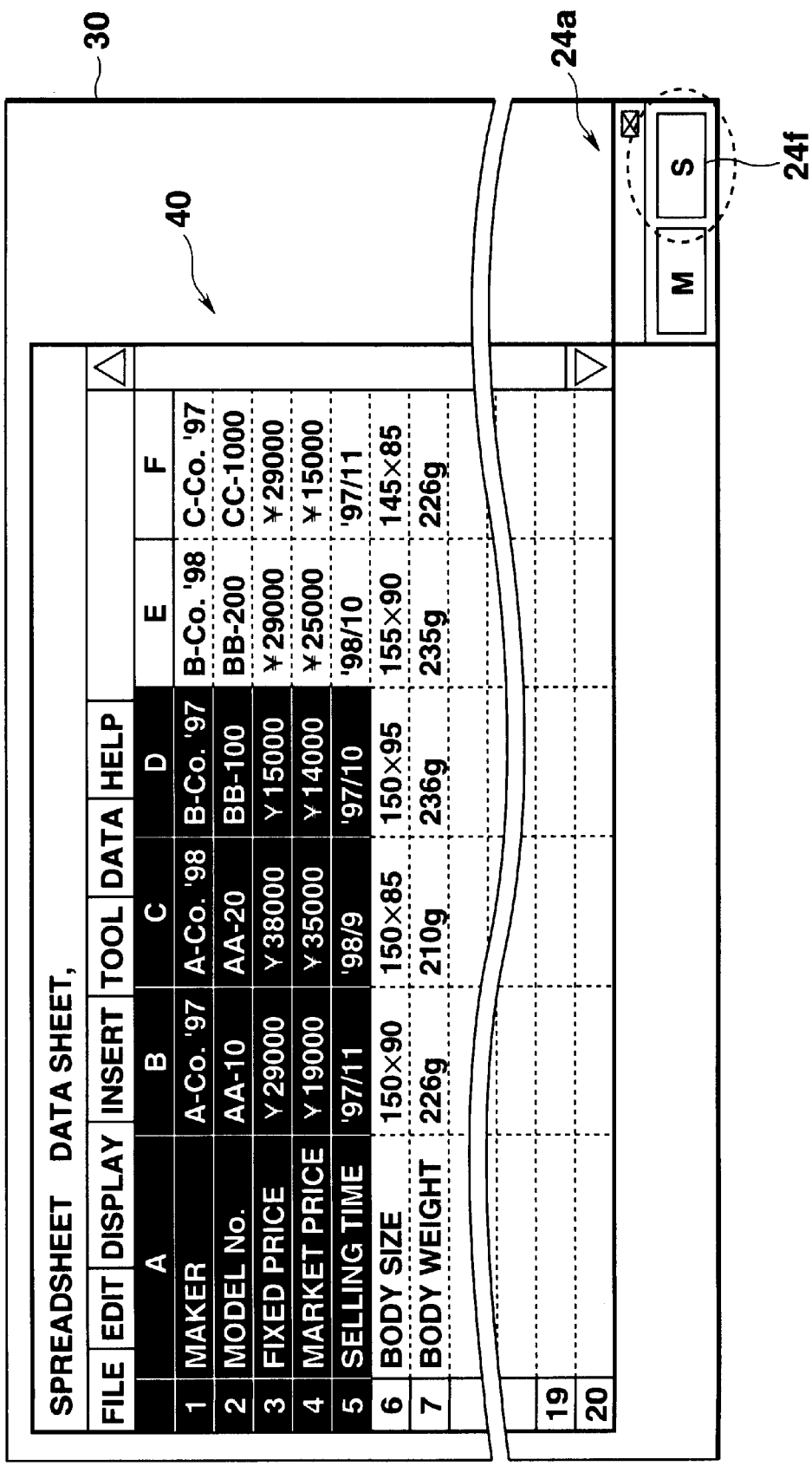
FIG. 19 illustrates a display screen which displays the range of a spreadsheet specified by a spreadsheet program.

Now, as shown in FIG. 19, when the application program 31 is set as an active window and the range of any particular portion of a plurality of cells is specified with a mouse, the cells in the range are displayed in an inverted manner, as shown. When an "S" command button 24f of the GU interface 24a is clicked in this state, the data communication program (FIGS. 7 or 11) is executed, and the string of characters within the cells of the specified range is transmitted to the PDA 13. Of course, it is necessary that the PDA 13 has been connected by the cable 12 to the personal computer 10 and the communication program (FIG. 5) has been executed in the PDA 13.

Figure 21:
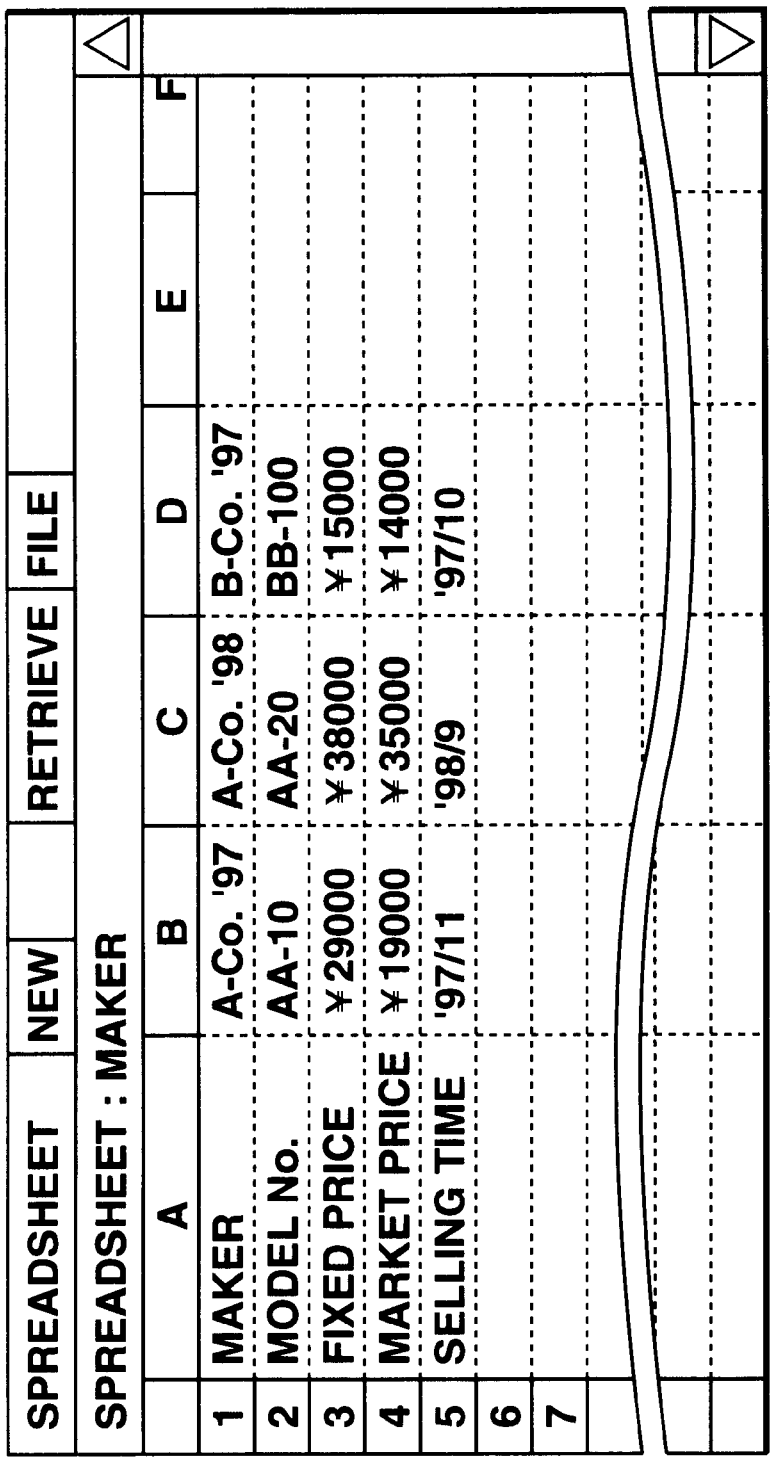
FIG. 21 illustrates a display screen which displays a spreadsheet.
Figure 22:
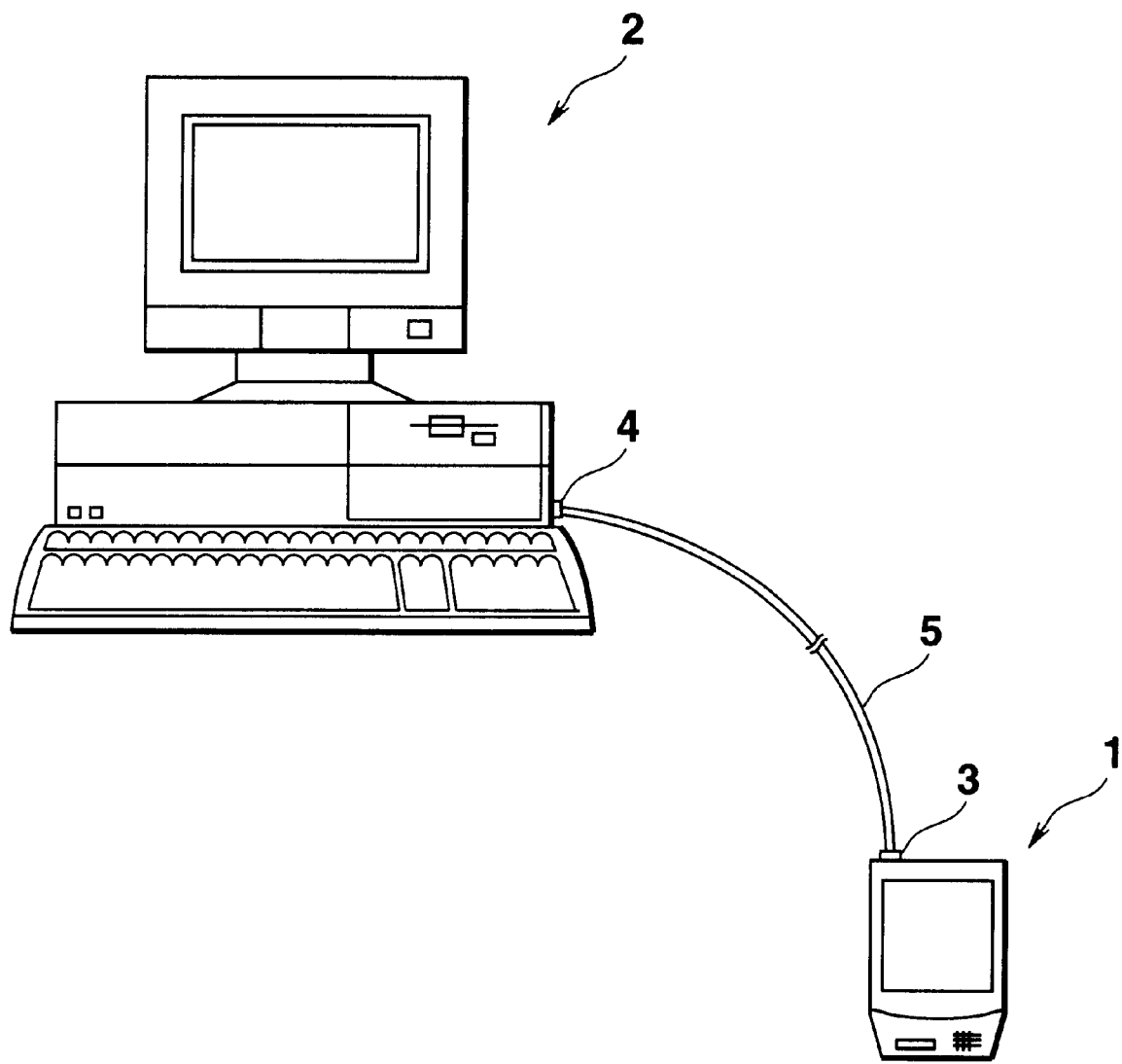
FIG. 22 shows a conventional connection between a personal computer and a PDA.

FIG. 20A shows an example of a list of spreadsheets displayed on the PDA 13 "before data transfer" and FIG. 20B an example of a list of spreadsheets "after data transfer", in which a character string (for "maker") within the head cell (column A, row 1) in the selected range in FIG. 19 is additionally displayed as a title. When the title is clicked, the spreadsheet shown in FIG. 21 is opened to provide a display in which the information in all the cells in the selected range and the cell positions of FIG. 19 is correctly reproduced.

As described above, according to the present invention, when the range of desired ones of a large amount of data is specified which is acquired and specified by any particular one of various kinds of programs on an information transmission apparatus (personal computer or the like), it is transmitted as a new file to the personal digital assistant. The personal digital assistant can receive the file, store it in a predetermined data area, use the file data and display the content of the file.

The present invention is not restricted to the embodiment described above. According to the present invention, a personal digital assistant as an information transmission apparatus may be connected to a network to get data from the network and send it to another wristwatch type portable information device.

What is claimed is:

1. An information display apparatus comprising:
   a display device;
   data specifying for specifying any range of data displayed on said display device; and
   file producing and registering means for automatically producing a file containing data in the specified range, for automatically giving the file a file name which includes predetermined data in the specified range, and for automatically registering the produced file.

2. The information display apparatus according to claim 1, wherein said file producing and registering means comprises first registering means for registering the data in the specified range in a file form corresponding to a form of the data in the specified range.

3. The information display apparatus according to claim 2, wherein said first registering means comprises:
   data kind detecting means for detecting a kind of the data in the specified range; and
   second registering means for registering the data in the specified range in the file form depending on the kind of data detected by said data kind detecting means.

4. The information display apparatus according to claim 3, wherein the data kind detecting means detects the kind of the data in the specified range based on a predetermined delimiter contained in the data in the specified range.

5. The information display apparatus according to claim 2, wherein said first registering means, responsive to a user specifying the file form, registers the data in the specified range in the file form depending on the form of the data in the specified range.

6. The information display apparatus according to claim 1, wherein said file producing and registering means comprises:
   divided file producing means for determining whether or not a quantity of the data in the specified range exceeds a predetermined quantity, for dividing the data in the specified range into a plurality of data pieces if the quantity of the data in the specified range exceeds the predetermined quantity, and for producing a like number of subfiles containing the divided plurality of data pieces, respectively, each subfile having a different name including the file name and additional data; and
   divided file registering means for registering the respective subfiles produced by said divided file producing means.

7. The information display apparatus according to claim wherein said divided file producing means comprises dividing means for dividing the data in the specified range into the plurality of data pieces so that data in one subfile overlaps with data in an adjacent subfile at a boundary formed therebetween.

8. The information display apparatus according to claim 1, further comprising sending means for sending the file registered by said file producing and registering means to an external portable information terminal.

9. A computer readable program for causing a computer to perform a process comprising:
   automatically producing a file containing data in a range specified by a user out of data displayed on a display device; and
   automatically giving the file a name which includes predetermined data in the specified range, and automatically registering the produced file.

10. The computer readable program according to claim 9, wherein the program further enables the computer to send the registered file to an external portable information terminal.

* * * * *

UNITED STATES PATENT AND TRADEMARK OFFICE
CERTIFICATE OF CORRECTION

PATENT NO.    : 6,487,597 B1
DATED         : November 26, 2002
INVENTOR(S)   : Takuya Horie and Masaaki Yanagisawa It is certified that error appears in the above-identified patent and that said Letters Patent is hereby corrected as shown below:

<u>Column 12,</u>
Line 34, change "claim" to -- claim 6 --

Signed and Sealed this

Thirteenth Day of January, 2004

JON W. DUDAS
*Acting Director of the United States Patent and Trademark Office*